S. M. LILLIE.
COMPOSITION OF MATTER AND PROCESS FOR MANUFACTURING THE SAME.
APPLICATION FILED AUG. 29, 1911.
1,014,237.
Patented Jan. 9, 1912.
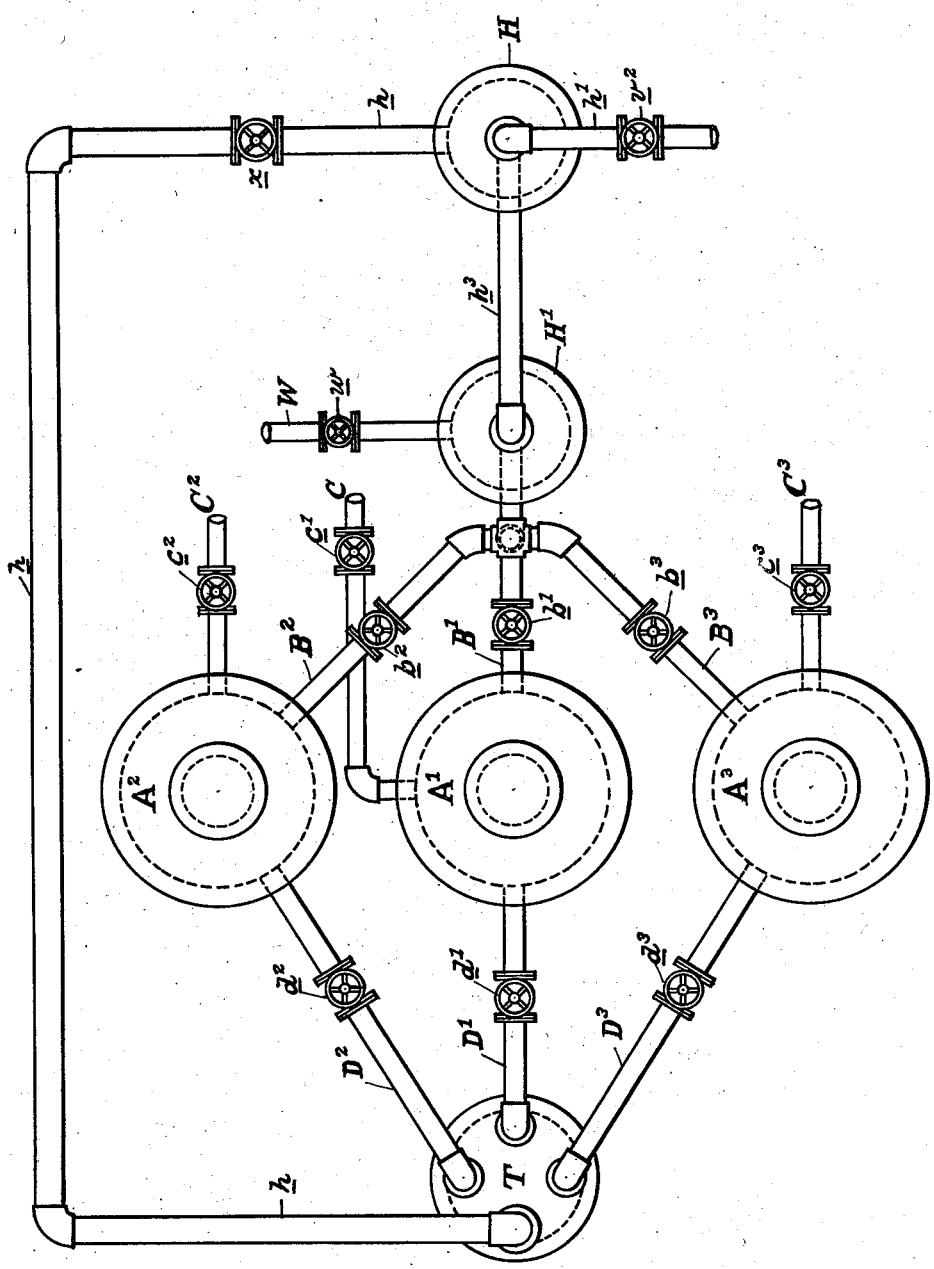
WITNESSES:
INVENTOR

UNITED STATES PATENT OFFICE.

SAMUEL MORRIS LILLIE, OF PHILADELPHIA, PENNSYLVANIA.

COMPOSITION OF MATTER AND PROCESS FOR MANUFACTURING THE SAME.

1,014,237.　　　　　Specification of Letters Patent.　　　Patented Jan. 9, 1912.

Application filed August 29, 1911.　Serial No. 646,754.

*To all whom it may concern:*

Be it known that I, SAMUEL MORRIS LILLIE, of Philadelphia, Pennsylvania, have invented a new and useful Composition of Matter and a Process for Manufacturing the Same, of which the following is a specification.

The composition of matter is a composite product from the conversion of starch, which has for its component parts two or more "sub-products" of starch conversion (to give them a name) which have been carried to different degrees of conversion respectively, but of which each has all its starch carried to approximately the same degree of conversion, e. g. each "sub-product" has had all its parts subjected to practically the same converting effects of water, heat and converting reagent. For example, divide a mixture of starch, water and acid into three portions and subject one portion "$a$" all of it to a temperature of say 250° Fahr. for four (4) minutes and no more, another portion "$b$" all of it to the same temperature for six (6) minutes, and no more, and the third portion "$c$" all of it to the same temperature for eight (8) minutes, and no more, each of these sub-products $a$, $b$ and $c$ will be constituted throughout of parts having approximately the same degree of conversion, and the "composite product" will have for its component parts the sub-products $a$, $b$ and $c$. Each of these sub-products is a composition of matter, which is, I believe, new, viz. a partially converted starch product, of which the constituent parts have approximately all the same degree of conversion, i. e. have all been subjected practically to the same converting conditions of water, heat and converting agent.

For the manufacture of this composition of matter or "composite product" I prefer to use a continuous converting process and apparatus such as are disclosed in my Patent No. 959,237, dated May 24th, 1910, which include a method of an apparatus for preheating by which considerable of the heat used in the conversion of the starch is recovered and is used for heating purposes. In the accompanying drawings is shown in plan a combination of three converting vessels, each similar to the converting vessel shown and described in my said patent, namely $A^1$, $A^2$ and $A^3$, a pressure reducing tank T common to all the converting vessels, and heaters H and $H^1$ also common to the three converting vessels. The tank T, and heaters H and $H^1$ are similar to the pressure reducing tank and heaters of my patent above mentioned. By this combination of two or more converting vessels, the two or more component parts ("sub-products") of the composite product may be made continuously and simultaneously and be continuously mixed to form a composite liquor as hereinafter described. By any one of the converters may be made the composition of matter, referred to above, which has all of its constituent parts of the same degree of conversion approximately.

A general description of converting the starch as practiced in each of the converting vessels is as follows: The process of treating the starch consists in mixing the starch with water and acid to form a mixture of the desired mobility and acidity in quantities sufficient to supply requirements; in forcing the said mixture of starch, water and acid continuously and at a uniform rate of flow, corresponding to the quantity of product wanted, through suitable heating devices and heating it therein under pressure to the desired converting temperature, say 280 degrees Fahr., making this heating period so brief that the starch mixture on leaving it will have suffered only a partial conversion; in delivering this but only partially converted heated mixture with an even distribution over the cross section of a column of the mixture, to which no more heat is added, moving uniformly through a containing vessel in which vessel the pressure is maintained not less than that corresponding to the converting temperature to which the mixture has been raised; in withdrawing from the end of the column the mixture at the same rate at which it is being delivered to the column at the opposite end, i. e., the uniform rate necessary to produce the desired quantity of product in a given time; in varying the length or depth of the said column of mixture to vary the length of time the liquors shall be subject to the converting temperature and thereby vary the degree of conversion; and finally in neutralizing the acid in the mixture by means of a suitable re-agent, approximately at the time it leaves the end of the column, or just prior to this. This process of heating and converting the starch is fully set forth in my said U. S. Patent #959,237.

Referring to the drawings: A single pressure reducing tank T serves for the three converting vessels or converters $A^1$, $A^2$, $A^3$; the discharge pipe D of each converter leads into it and is fitted with a valve $d$. The three converters are served also by a single pre-heating system which is represented by the two heaters H and $H^1$; H being a low pressure heater in which the vapors released in the common pressure reducing tank T are employed in heating the cold starch liquor as hereinbefore described, and $H^1$ being a heater in which high pressure steam is employed for a further heating of the starch liquor preparatory to passing into one or more of the converters. A starch liquor feed pipe to the heater H is represented by $h^1$. A liquor conducting pipe $h^3$ leads from heater H to heater $H^1$, and a discharge pipe indicated by dotted lines for the heated starch liquor leads from heater $H^1$, which pipe has three branches—$B^1$, $B^2$, $B^3$,—leading into the upper parts of the several converters $A^1$, $A^2$, $A^3$. The branches are provided with suitable valves—$b^1$, $b^2$, $b^3$, respectively.

The combination of apparatus shown in the drawings may be employed for making the "composite product" of converted starch, composed of the said three "sub-products" $a$ $b$ and $c$ as follows, which it will first be assumed are to be mixed in equal proportions by volume to make the "composite product." Assuming now that the apparatus in Fig. 2 is in full operation, and that the three converters are making respectively the three "sub-products," the conditions are as follows, viz:

The acidified starch liquor is flowing from the liquor pipe $h^1$ in to the heater H, and from it through the heater $H^1$ into the three converters, and through the same into the tank T at an approximately uniform total rate sufficient to supply the quantity of "composite product" wanted in a unit of time. The valves in the liquor conducting branch pipes $B^1$, $B^2$, $B^3$, leading from the heater $H^1$ into the three converters respectively, are adjusted so that the flow of the starch liquor is the same into all of the converters, and by means of the discharge valves $d$ of the three converters the depth of liquor in the three are respectively maintained in the manner described in my U. S. Patent #959,237, such that the acidified starch liquor in each is subjected to the influence of the high temperature in the converter the duration necessary to produce the degree of conversion desired in the "sub-product" made in that converter. For example, supposing the same temperature in all the converters and the "durations" needed to make the three "sub-products" wanted are four, six, and eight minutes respectively, then by means of the discharge valve $d$ of, say, converter $A^1$ the liquor level is maintained therein at a height to cause the parts of the liquor to be four minutes in passing through it; in the second converter $A^2$ the liquor is maintained at a depth by the discharge valve $d$ to cause the parts of the flowing liquor to be in it six minutes and in the third converter $A^3$ the parts of the liquor are made by the discharge pipe $d$ to be eight minutes in passing through the converter, then there will be flowing into the pressure reducing tank T three "sub-products" each of a nearly uniform composition and having respectively degrees of conversion due to four, six, and eight minutes subjection to the converting temperature, and which mixing, or mixed together, form the "composite product" desired.

If it should happen that it was desired to mix the said three sub-products in unequal proportions by volume, then the three feed valves $b^1$, $b^2$, $b^3$, to the respective converters would be set so that the flow of liquor to each converter would bear to the total flow of liquor the proportion desired, and the depth of liquor maintained in the converter that which gives the degree of conversion wanted for its product. If each of the feed valves $b^1$, $b^2$, $b^3$, be of the "gate" variety with ports rectangular, narrow and long, with the length in the direction of the travel of the gate, and the gate be rectangular, the rate of flow of the liquor through each valve will be nearly proportional to the rise of the gate, and the regulation of the flows mentioned be comparatively easy.

If but two sub-products were wanted, then but two of the converters would be employed for making the composite product, and the third converter could be used for another product. If more than three "sub-products" were wanted in the "composite product" then if they were to be made simultaneously there should be as many concreters as sub-products.

Neutralization of the acid in the products of conversion may be made in the sub-products separately before mixing or in the mixed or composite product.

I do not limit myself to the exact procedures and apparatus described herein, for departures may be made from each without passing beyond the scope of my invention.

I claim as of my invention:—

1. A composite starch conversion product consisting of a mixture of two or more sub-products of starch conversion, each sub-product having all its parts of approximately the same degree of conversion; but the degree of conversion of each sub-product being materially different from that of every other sub-product.

2. The process of making a composite starch conversion product of the character described consisting in making the sub-products simultaneously each in its own converter, in discharging them simultaneously from their respective converters and in mixing together the several sub-products.

3. The process of making a composite starch conversion product of the character described consisting in making the sub-products simultaneously each in its own converter, in discharging them simultaneously from their respective converters, in mixing together the several sub-products, and in mixing the vapors from the several converters and heating with the mixed vapors the starch liquor on its way to the several converters.

4. The process of utilizing the vapors released from the converted starch products issuing simultaneously from as many converters consisting in mixing the vapors and heating with the mixed vapors the starch liquor on the way to the several converters.

5. The process of making a composite starch conversion product of the character described, consisting in making the sub-products each by itself and in mixing together the sub-products in the proportions desired to form the composite product.

S. MORRIS LILLIE.

Witnesses:
 COLIN D. SMITH,
 W. A. McMAHON.